[19] United States Patent  
Eppler

[11] 3,840,394  
[45] *Oct. 8, 1974

[54] COMPOSITION AND PROCESS FOR GLAZING CERAMIC WARE

[75] Inventor: Richard Andrew Eppler, Timonium, Md.

[73] Assignee: SCM Corporation, Cleveland, Ohio

[ * ] Notice: The portion of the term of this patent subsequent to July 25, 1989, has been disclaimed.

[22] Filed: June 15, 1972

[21] Appl. No.: 263,117

Related U.S. Application Data

[60] Division of Ser. No. 108,145, Jan. 20, 1971, abandoned, which is a continuation-in-part of Ser. No. 828,345, May 29, 1969, Pat. No. 3,561,984, which is a continuation-in-part of Ser. No. 625,000, March 22, 1967, abandoned.

[52] U.S. Cl................... 117/125, 65/33, 106/39.6, 106/48, 106/49, 106/52, 106/53, 106/54, 117/169 A
[51] Int. Cl........................... C03c 5/00, C03c 3/22
[58] Field of Search........... 106/39.6, 48, 49; 65/33; 117/125, 169 A

[56] References Cited
UNITED STATES PATENTS

| | | | |
|---|---|---|---|
| 3,022,179 | 2/1962 | Morrissey | 65/33 |
| 3,380,838 | 4/1968 | Sack | 117/125 |
| 3,463,647 | 8/1969 | Kosiorek | 117/125 |
| 3,480,452 | 11/1969 | Fleischner | 106/39 |
| 3,499,787 | 3/1970 | Inoue | 117/125 |
| 3,532,524 | 10/1970 | Petticrew | 106/48 |
| 3,679,464 | 7/1972 | Eppler | 117/125 |

FOREIGN PATENTS OR APPLICATIONS

| | | | |
|---|---|---|---|
| 203,801 | 4/1966 | Sweden | 106/39 DV |
| 383,270 | 4/1963 | Japan | 106/39 DV |
| 848,447 | 9/1960 | Great Britain | 106/39 |

*Primary Examiner*—William D. Martin
*Assistant Examiner*—William H. Schmidt
*Attorney, Agent, or Firm*—Thomas M. Schmitz

[57] ABSTRACT

This patent application describes a composition for glazing ceramic ware, preparations useful for making same, process for glazing bodies and substrates with same, and resulting coated ceramic bodies. The composition for glazing is characterized by containing a particulate vitrifiable material, at least a substantial fraction of which is in the particulate vitreous state said vitrifiable material, after melting into a fluent vitreous state, being self-nucleating or autocrystallizable or crystallizable, into a substantially dimensionally stable continuous vitreous film in which are dispersed crystals of low thermal expansion. The glazing composition is particularly suited for glazing low expansion ceramic whiteware. Set forth as useful preparations are special particulate alkaline earth aluminosilicates modified with flux in proportion controlled to restrict the development of a primary low thermal expansion crystalline phase, some of said preparations being modified with zirconia. The glazing process comprises partially coating a ceramic body with the composition for glazing, firing the coated body at a temperature sufficiently high and for a time sufficiently long for converting the composition into a fluent continuous vitreous surface coating, then adjusting the temperature to a value at which crystal growth in the surface coating occurs at a measurable rate, and finally cooling the resultant glazed ware at a rate consistent with keeping the ware integral. The invention shows particular advantage for making glazes of adjustable and low thermal expansion for thermal shock and mechanical shock resistant ceramic whiteware, for example, dinnerware, cookware, ceramic tile, acoustical tiles of the mineral type, sanitary ware, artware, and electrical and technical porcelain. The invention is specially adaptable to conventional "two-fire" glazing practice.

4 Claims, No Drawings

COMPOSITION AND PROCESS FOR GLAZING CERAMIC WARE

This application is a division of application Ser. No. 108,145, filed Jan. 20, 1971, now abandoned, which is a continuation-in-part of application Ser. No. 828,345, filed May 29, 1969, now U.S. Pat. No. 3,561,984, which is a continuation-in-part of application Ser. No. 625,000, filed Mar. 22, 1967, now abandoned. The disclosure of U.S. Pat. No. 3,561,984 is incorporated herein by reference.

This invention relates to a composition for glazing ceramic ware preparations useful for making said composition, process for glazing ceramic bodies and substrates with said composition, and the resulting coated ceramic bodies.

Heretofore compositions for glazing ceramic ware have not been available with the extremely low coefficients of thermal expansion possible by using this invention. A particular advantage of this invention is that is is specially adaptable to conventional glazing practice such as the U.S. "two-fire" glazing practice as well as other techniques. The invention is also particularly advantageous for making glazes of adjustable and very low thermal expansion for thermal shock-and/or mechanical shock-resistant ceramic whiteware, for example, dinnerware, cookware, ceramic tile, acoustical tiles of the mineral type, sanitary ware, artware, and electrical and technical porcelain.

In one aspect the invention is a composition for glazing ceramic ware comprising 100 parts of particulate vitrifiable material, at least a substantial fraction of which initially is in the vitreous state, said vitrifiable material, after melting into a fluent vitreous state, being partially devitrifiable and crystallizable into a substantially dimensionally stable, continuous, vitreous coating in which are dispersed crystals having average coefficient of thermal expansion less than $4 \times 10^{-6}/°C.$; 0–15 parts ceramic clay (other than a montmorillonite clay); 0–5 parts of a montmorillonite (such as bentonite) as a suspending assistant; 0–20 parts of ceramic colorant or stain; 0–20 parts ceramic opacifier such as zirconia, titania, tin oxide, or cerium oxide; 0–0.4 part electrolyte for suspending, dispersing, peptizing and/or thickening such as calcium chloride, sodium silicate, sodium tetrapyrophosphate, methyl cellulose, and sodium carboxy methyl cellulose; and 0–90 parts water.

Typical water concentrations in a resulting slip would be between about 15 and about 90 parts per 100 parts of the particulate vitrifiable material, for example, 20–40 parts for a dipping application of the glazing composition; 70–90 parts for roller coat application; and 60–80 parts for spray application. Other forms of application can include waterfall glazing of the ceramic body or substrate, or brushing or blade application of such slip.

The particulate vitrifiable material useful for partially devitrifying or crystallizing into the low expansion glaze having a continuous vitreous phase should be at least partially in the vitreous state initially. Suitably at least the water soluble constituents such as carbonates, borax, boric acid, sodium fluoride or potassium fluoride should be combined as vitreous matter so as to resist water solution. It is especially desirable to have no more than 1 percent by weight of the particulate devitrifiable material extractable in water at room temperature when 100 grams of the material are suspended in 1,000 ml. of water. Advantageously, the particulate vitrifiable material is at least 10–15 percent by weight in the vitreous state as frit and preferably at least about 75 percent by weight frit to achieve best interaction of all the components in subsequent firing and resulting glazing. For example, the particulate vitrifiable material can be talc or clay mixed with other materials which are entirely in the vitreous state as a frit or a mixture of frits. Preferably the entire particulate vitrifiable material in the composition other than the listed mill additions is a frit or a mixture of frits. The optional stains, opacifiers, clay, bentonite and other solids can be mixed intimately into the composition as mill additives. Wet grinding of the composition ordinarily is practiced, but the solids can be ground dry if desired, with water added subsequently to the premilled solids to make a slip. To achieve best utility and performance there should be no more than about 3 percent, and preferably no more than about one-half percent of the particles retained on a 325-mesh (Tyler Standard) screen after milling of the composition for application to a ceramic body.

The particularly low average coefficients of thermal expansion of the crystals formed when the particulate vitrifiable materials are partially devitrified or crystalized is the basis for the special utility of the instant composition for glazing ceramic ware. These crystals formed in the devitrification should have average thermal expansion less than $4 \times 10^{-6}/°C.$, suitably no more than about $2.5 \times 10^{-6}$ down to about $1 \times 10^{-6}$, or even no measurable coefficient or a slightly negative one such as minus $1 \times 10^{-6}$. Average thermal expansion of a crystal means that the expansion is averaged over all crystallographic directions. These crystals are held in a matrix of continuous vitreous coating to yield a substantially non-porous glaze over the ceramic substrate, which glaze can be made glossy or matte as necessary or desired for utility in accordance with invention principles. The overall glaze composition after firing should have an overall coefficient of thermal expansion less than $5 \times 10^{-6}/°C.$, advantageously about $1 \times 10^{-6°}$ to $4 \times 10^{-6}/°C.$, and preferably about $1 \times 10^{-6°}$ to $3 \times 10^{-6}/°C$. The thermal expansion values spoken of in this specification in connection with glazes and bodies are the average linear thermal expansion coefficient of these materials for the temperature range of 50°–350°C.

In order to obtain the glazing effectiveness, the particulate devitrifiable material must be meltable into a fluent vitreous state of comparatively low viscosity for flowing and spreading onto the ware and giving the glaze film. The particulate vitrifiable material of the composition can be thought of as basically two portions, the portion which in the glazing operation crystallizes or devitrifies to yield the necessary extremely low expansion crystals, and a flux which makes substantially the balance of the material into a continuous vitreous film-forming matrix that resists devitrification under the glazing conditions.

To distinguish the particulate vitrifiable material useful in compounding the composition for glazing from the composition as a whole, which can include various mill additions, said particulate vitrifiable material by itself hereafter will be referred to as a "preparation." In another aspect of this invention particularly useful preparations are set forth which yield upon firing the required fluency for glazing and subsequently are crystallizable or devitrifiable into a dimensionally stable continuous vitreous coating in which are dispersed the very low expansion crystals. The flux (which can be considered a diluent) reacts to make a glass of the preparation in the firing operation, the flux being fully soluble in the fluent melt.

In preparations involving $BaO \cdot Al_2O_3 \cdot SiO_2$ the low expansion celsian crystalline phase can precipitate. In preparations involving $BaO \cdot MgO \cdot Al_2O_3 \cdot SiO_2$ systems an unnamed low expansion crystal can precipitate, this crystal approximating one equivalent of barium oxide and two of magnesium oxide per five equivalents of alumina and 12 equivalents of silica; it is referred to in the text, "Thermal Properties of Ceramics," page 29, by Smoke & Koenig (1958). In preparations involving $Na_2O \cdot BaO \cdot Al_2O_3 \cdot SiO_2$ the crystals nepheline and celsian can precipitate.

Accordingly, the inventive preparations yielding the resulting low expansion glaze containing the aforementioned low expansion crystals can be described as particulate mixtures providing a special resulting ingredient composition set.

The inventive preparations yielding on firing the required continuous vitreous phase containing the very low expansion crystals is the preparation providing the resulting ingredient composition range as follows:

| Ingredient | Percent |
| --- | --- |
| BaO | 6–65, but not less than 15% when no MgO or $Na_2O$ is present |
| MgO | 0–12 |
| $Na_2O$ | 0–15, the subtotal sum of the BaO plus MgO plus $Na_2O$ being from 12% to 65% |
| $Al_2O_3$ | 9–35 |
| $SiO_2$ | 18–65, the subtotal sum of the BaO, MgO, $Na_2O$, $Al_2O_3$ and $SiO_2$ being 70–95% |
| Flux | 5–30 | wherein said flux is: $B_2O_3$, $K_2O$, F, $Li_2O$ up to 1 percent, PbO, CaO, SrO, ZnO, or a mixture of same; and wherein ingredients of said preparation set are vitrified to an extent at least sufficient for rendering said preparation substantially water-resistant.

Lithia ($Li_2O$) is listed above as a suitable flux in proportions of up to 1 percent by weight of the preparation. When lithia is present substantially in excess of 1 percent by weight of the preparation, the lithia does not remain in the vitreous phase as a flux; and there is a tendency to precipitate lithium aluminosilicate crystalline phases at the expense of the barium containing crystalline phases. In small proportions, such lithium aluminosilicate crystalline phases in combination with the barium containing crystalline phases are not detrimental to the performance of the low expansion glaze. For maximum crystallization of the barium-containing crystalline phases, the lithia content is less than 0.5 percent, preferably less than 0.2 percent by weight of the preparation; and most preferably the proportion is substantially lithia free. When lithium aluminosilicate is desired as the predominant crystalline phase, the glazes should be formulated in accordance with U.S. Pat. No. 3,561,984.

The glazes within the composition range set forth above have coefficients of thermal expansion typically in the range of about 2 to 3 $\times$ $10^{-6}$/°C. and are especially suited for glazing cordierite ceramic bodies having coefficients of expansion in the range of 3 to 4 $\times$ $10^{-6}$/°C.

Preferably for efficiency and economy, the preparation is within the composition range:

| Ingredient | Percent |
| --- | --- |
| BaO | 8–15 |
| MgO | 5–10 |
| $Na_2O$ | 0–5, the subtotal sum of the BaO plus MgO plus $Na_2O$ being from 13 to 25% |
| $Al_2O_3$ | 10–25 |
| $SiO_2$ | 45–65, the subtotal sum of the BaO, MgO, $Na_2O$, $Al_2O_3$ and $SiO_2$ being 80–95% |
| Flux | 5–20, wherein $Li_2O$ is less than 0.5% |

In all instances the ingredients in the foregoing preparations are vitrified to an extent at least sufficient for rendering such preparation substantially water resistant as hereinbefore described (so that application of the preparation to a substrate cannot involve an aqueous leaching away of the necessary interacting materials and resulting disproportionation of the preparation). Because some of the probable reactions that occur upon firing are solid state reactions, extremely intimate and substantially homogeneous distribution of the reactants in close proximity to each other certainly is desirable for greatest reaction efficiency. Accordingly, it is advantageous that a substantial fraction of the preparation be in vitreous condition, and preferably that the preparation is a single frit or an intimate mixture of frits to insure intimacy of the interacting components as well as water resistance.

In a further aspect of the invention there is presented a process for glazing a ceramic body which comprises:

a. at least partially coating the body with a composition for glazing of the type described herein;

b. firing the resulting coated body at a temperature sufficiently high and for a time sufficiently long for converting said composition into a fluent, continuous, vitreous surface coating;

c. then adjusting temperature to a value at which crystal growth is said vitreous surface coating occurs within not substantially more than several hours;

d. then cooling the resultant glazed ware at a rate consistent with keeping the ware integral.

As an advantageous embodiment of this process the firing is performed at a temperature not substantially more than about 500°C. above the liquidus of the composition for glazing to suppress a generally undesirable irregular effect known as "orange peeling" and to yield a smooth glaze without such surface irregularities. In most instances the firing temperature will be about 100°–300°C. or so above the liquidus of the composition for glazing. At the liquidus crystals can be present which prevent the necessary fluidity. The instantaneous fluid viscosity of the composition during the firing step shall be less than at the softening point (as defined by the conventional ASTM procedure applied to glasses) which viscosity at softening point is about $10^{7.6}$ poises. For compositions for glazing utilizing compositions within these ranges the preferred firing temperatures are 1,100°–1,300°C.

The most practical procedure for adjusting temperature to a value at which crystal growth in the fluent vitreous coating occurs in a practical time, that is, in several minutes to at least within several hours, is to reduce the temperature after the firing step to a temperature below the liquidus of the highest melting crystal to be produced in the resulting vitreous matrix, although in some systems the temperature conceivably could be raised to obtain devitrification at the desired rate of crystal growth. As a practical matter the temperature stage of inducing crystal growth is in the range of about 700°–1,000°F. For each particular preparation and mill additions thereto it should be understood, however, that there will be optimum temperatures to achieve this devitrification at a desired practical rate in a time not substantially more than several, i.e., 20–30 hours, and usually in a much shorter overall time, e.g., as little as 8–10 minutes, to accommodate rapid production of glazed ware.

The final step in the glazing process is to cool at a rate that is not so fast as to cause undesirable cracking or crazing or undesirable strains in the resulting glazed object or its glazed surface, in other words, at a rate consistent with keeping the ware integral. The cooling can be done reasonably fast for production purposes, some systems being air-coolable from a temperature as high as about 816°C. to room temperature with the coated work merely maintained on a metal support. A practical rate of cooling is 1° to 10°C. per minute, and the cooling can be quite slow where long cooling times can be accommodated.

The instant invention is to be distinguished from conventional operations for making semi-crystalline glazes for artistic purposes because such conventional glazes contain crystals having average coefficients of thermal expansion above $4 \times 10^{-6}/°C$. Such glazes are not useful for glazing high petalite or cordierite bodies or other bodies of similarly low thermal expansion.

Furthermore, the instant invention is to be distinguished from the conventional preparation of devitrified glass bodies typified by the well-known Pyroceram product and related processes (the term "Pyroceram" being a trademark of Corning Glass Works). Typically, in the preparation of such devitrified glass forms, the formulation and operation is directed to induce crystallization in glass at a fairly low temperature so as to maintain dimensional stability of the form. Practically a minimum viscosity of $10^9$ poises is required; preferably a minimum viscosity of $10^{11}$ poises should be used. In contrast the present invention is directed to obtain working fluency of the molten devitrifiable material so it will coat a body efficiently, the viscosity in this condition being typically several powers of 10 less than the glass in the conventional glass devitrifying operation. Fluid viscosity of a typical inventive composition at useful firing temperatures was measured at between $10^5$ and $10^6$ poises using the concentric cylinder method (R. A. Eppler, J. Am. Cer. Soc. 49(12):679, December 1966).

As stated before, the instant particulate vitrifiable material in the composition for glazing must have at least a substantial fraction already in the vitreous state to obtain the desired interaction for the instant operation, and the most practical way to achieve the glazing is to heat the instant bisque coating beyond the liquidus of any crystals present, then reduce temperature for the crystal growing step. In contrast the normal heating path for making low expansion devitrified bodies, e.g., as shown in U.S. Pat. Nos. 3,066,775; 3,252,811; 2,920,921; 3,161,528 and 3,272,610, is to make a glass body in the conventional sense, the body being formed in desired shape so that it is extremely highly viscous and dimensionally stable, give it a comparatively low temperature nucleating "soak" to maximize the viscosity within the body, then raise the temperature of the body to a temperature which is below the liquidus of the crystals being formed. U.S. Pat. No. 3,084,053 first converts the glass to frit, aggregates the frit into desired shape, then treats similarly.

The most suitable compositions for glazing according to this process are those containing particulate vitrifiable material providing one of the resulting ingredient composition ranges described above, and preferably prepared so as to be substantially entirely in the vitreous state as frit particles.

The coating step preparatory to firing of the coated ceramic body can be done as previously described in connection with the composition for glazing, above, by spraying, dipping, and other conventional techniques. In its unfired condition the thus-coated ware can be considered as being in the bisque condition. The conventional two-fire system is to make the body, fire it at some high temperature, cool it, then apply the glazing material, and refire at a lower temperature than that at which the body was fired. Other practices include that of coating the unfired (green) body and firing the glaze and body simultaneously. In some instances manufacturers have found it desirable to form the body, fire it only to dryness at some low temperature, then apply the glaze and fire the coated body at a higher temperature. Hence, for my purposes, the body can be preformed and fired, or green, or merely dried before application of the glaze, although the two-fire system is used most generally in the U.S., is the most demanding on compositions for glazing, and the instant invention is specially suited for such system.

Particularly useful ceramic bodies for my glazing process and for making the resulting glazed article are those compounded with various low expansion ceramic materials to give such body a thermal expansion coefficient between about $1 \times 10^{-6}/°C$. and about $6 \times 10^{-6}/°C$. and preferably between about $2 \times 10^{-6}/°C$. and about $5 \times 10^{-6}/°C$. For glazing of such body, the overall coefficient of thermal expansion of the instant compositions for glazing should be at least as low as the body to prevent crazing; advantageously about $1 \times 10^{-6}/°C$. lower than the body; for compression glazing this differential most desirably is $2 \times 10^{-6}/°C$. to $4 \times 10^{-6}/°C$., the body being the higher in expansion. Accordingly, the particular glaze composition utilized here should be matched to the body in differential of coefficient of thermal expansion, the differential being in any case measured at the intended use temperature or over the use temperature range of the resulting glazed ware. For cookware thermal shock resistance is most desired over the operating temperature range of said ware. For dinnerware compression glazing most desirably is practiced for obtaining mechanical shock resistance at ordinary room temperatures and dishwashing temperatures. Selection of the instant glaze for the appropriate body to get a combination of thermal shock resistance and mechanical shock resistance is, of course, quite possible within the limits of this invention.

Minerals generally used in making up the bodies are petalite, cordierite, zircon, sillimanite, low expansion fire clays and/or wollastonite. Most suitable bodies for the instant purpose are those containing at least about 25 percent by weight of a lithia-bearing ceramic mineral such as petalite or a body containing at least about 50 percent cordierite so that the body has desired low expansion properties. Typical bodies can be compounded for high compression glazing having as a primary phase petalite, or talc (to produce a substantial cordierite phase) or a zircon, or sillimanite (to produce a mullite phase) in combination with feldspar, clay, flint and/or silica. Bodies containing a high proportion of wollastonite also can be glazed suitably using glazes that fire at a temperature lower than that used is previously proposed glazing practice for this material (approaching 1,200°–1,300°C.), this being a definite advantage of applying the principles of the invention to wollastonite glazing practice.

Basically, to obtain the lowest expansion glaze, only enough flux is used to obtain the desired continuous vitreous surface which is adequately flowable into a coating film during the firing step, this minimum proportion of flux being as low as about 5 percent for some of the lithia-containing preparations, and at least about 7 percent in the most practical preparations described herein. The upper limitation of the flux content on the preparation is determined by the overall thermal expansion coefficient of the composite glaze. The maximum flux content in any useful case with such preparations is about 30 percent, and in some instances it must be less to keep within the necessary limits of thermal expansion.

Raw materials for providing the ingredients of the preparations are those conventional in the glass makers' art for supplying silica, alumina, and the other metal oxides for glass. The ingredients are provided alone or combined in various ways in minerals and chemicals. Purity of the raw materials mainly affects color of the glaze, thus the purer raw materials are more versatile.

The flux can be a single material, but most generally is a mixture or combination for efficiency or economy. The composition for glazing can be made boron-free, but $B_2O_3$ is advantageous to make the glaze most spreadable and fluent. Similarly, potassium oxide is desirable to promote gloss. The preferred flux is an approximately 50/50 mixture by weight of $B_2O_3$ and $K_2O$. The use of alkali metal oxides tends to raise the coefficient of thermal expansion of the vitreous phase in the resulting glaze. Flux materials that can be used include: $B_2O_3$ — suitably in the form of borax, boric acid and/or calcium borate; $K_2O$ — suitably in the form of potassium nitrate and/or potassium carbonate; F — suitably in the form of calcium fluoride, potassium silica fluoride, cryolite, sodium fluoride, and/or potassium fluoride; PbO — suitably in the form of litharge and/or red lead ($Pb_3O_4$); Lithia — suitably in the form of lithium carbonate in the proportions discussed above; CaO — suitably in the form of whiting (calcium carbonate), calcium fluoride, wollastonite, and/or calcium feldspar; SrO — suitably in the form of strontium carbonate; and ZnO — suitably in this oxide form. The zirconia in the preparation can be added as such or, more commonly, as zircon ($ZrSiO_4$).

The following examples show various ways in which the invention has been practiced, but should not be construed as limiting the invention. All temperatures are shown in degrees centigrade. In this specification all parts are parts by weight and all percentages are weight percentages unless otherwise expressly indicated.

EXAMPLE 1

The following raw materials were weighed out and mixed:

|  | parts |
|---|---|
| −200 mesh silica | 1088 |
| potassium nitrate | 161 |
| boric acid | 134 |
| magnesium carbonate | 146 |
| barium carbonate | 411 |
| magnesia | 195 |
| talc | 1414 |

The batch was placed in a fireclay crucible and smelted in an electric furnace at 1,430°C. for 6 hours. It was then poured into water to frit it and the frit allowed to dry. The frit then had the following composition:

|  | Percent |
|---|---|
| MgO | 8.36 |
| BaO | 10.55 |
| $Al_2O_3$ | 18.24 |
| $SiO_2$ | 57.85 |
| $K_2O$ | 2.5 |
| $B_2O_3$ | 2.5 |

The frit was then dried and ball-milled for 16 hours. Subsequently, 100 parts of the ball-milled frit, 4 parts bentonite and 40 parts water were ball-milled together for 1 hour and the mixture sprayed onto a bisque-fired body of the following composition:

|  | Percent |
|---|---|
| Petalite | 50 |
| Potash spar | 10 |
| Ball clay | 25 |
| Kaolin | 15 |

The body had been bisqued at 1,260° and the coating was applied to a wet weight of ½ to 1 gram per square inch of body.

The coated body then was fired as follows: heated at furnace rate (approximately 2 hours) to 1,100°; held 2 hours; cooled in the furnace (approximately 10 hours) to room temperature. The result was a translucent, matte, craze-free, non-porous semi-crystalline glass ceramic glaze on the tile body. The tile body itself had a brownish color which was visible through the translucent glaze.

EXAMPLE 2

The same slip as described in Example 1 was prepared and milled. It was sprayed onto a bisque-fired body of the following composition:

|  | Percent |
|---|---|
| Uncalcined kaolin clay | 36.7 |
| Talc | 20.4 |
| Barium carbonate | 6.2 |
| Calcined kaolin clay | 36.7 |

The body has been bisqued at 1,340° and the coating was applied to a weight of ½ to 1 gram per square inch of body.

The coated body was fired as described in Example 1.

The result was a cream white, matte, craze-free, smooth non-porous semicrystalline glass ceramic glaze on the tile body.

EXAMPLES 3–11

Raw materials listed in Table I, below, were separately weighed out and mixed as individual batches. Each batch was placed in a crucible and smelted and fritted as in Example 1. Each frit then had the composition given in Table II. Each frit then was dried and ball-milled for 14 hours. Subsequently, 100 parts of each frit were mixed with 4 parts bentonite and 40 parts water. Each such resulting slip was ball-milled for 1 hour more, then sprayed onto conventional cordierite bodies of the composition listed in Table III which had been prepared and bisque-fired as in Example 2.

Firing, crystal development and cooling to room temperature were done by heating at furnace rate (about 2 hours) to the firing temperatures indicated in Table IV; hold for 2 hours; cool the furnace (about 10 hours) to room temperature. In each case the resulting body had a coefficient of thermal expansion of about 3.0 × 3.5 × $10^{-6}$/°C. while the semicrystalline glass ceramic glaze coating thereon had a coefficient of thermal expansion of about 2.5 to 3.0 × $10^{-6}$/°C. In each of Examples 3 through 11, the result was a white, opaque, craze-free, non-porous, smooth, semicrystalline, glass ceramic, glaze on the cordierite body. The firing temperature and the gloss characteristics for these examples are reported in Table IV.

TABLE III

BODY COMPOSITION USED FOR EXAMPLES 3–11

| Material | Weight Percent |
| --- | --- |
| Uncalcined Kaolin Clay | 36.7 |
| Talc | 20.4 |
| BaCO$_3$ | 6.2 |
| Calcined Kaolin | 36.7 |

TABLE IV

| Example | 3 | 4 | 5 | 6 | 7 | 8 | 9 | 10 | 11 |
| --- | --- | --- | --- | --- | --- | --- | --- | --- | --- |
| Firing Temperature (°C.) | 1,260 | 1,230 | 1,260 | 1,230 | 1,230 | 1,260 | 1,260 | 1,230 | 1,260 |
| Gloss Characteristic | moderate | matte | matte | low | matte | moderate | low | matte | low |

I claim:

1. In a process for forming a substantially non-porous, semi-crystalline glass ceramic glaze on a fired ceramic body by the "two-fire" process, said glaze having a coefficient of thermal expansion of less than 5 × $10^{-6}$/°C, the improvement comprising the steps of:

a. at least partially coating said body with a glaze preparation comprising ceramic frit consisting essentially of:

| Ingredient | Percentage (by weight) |
| --- | --- |
| BaO | 6–65, but not less than 15% when MgO or Na$_2$O is not present |
| MgO | 0–12 |
| Na$_2$O | 0–15, wherein BaO + MgO + Na$_2$O is 12%–65% |
| Al$_2$O$_3$ | 9–35 |
| SiO$_2$ | 18–65, wherein the subtotal sum of BaO, MgO, Na$_2$O, Al$_2$O$_3$, and SiO$_2$ is 70%–95% |
| Flux | 5–30, |

TABLE I

RAW MATERIAL BATCHES

| Raw Material | Ex. 3 | Ex. 4 | Ex. 5 | Ex. 6 | Ex. 7 | Ex. 8 | Ex. 9 | Ex. 10 | Ex. 11 |
| --- | --- | --- | --- | --- | --- | --- | --- | --- | --- |
| KNO$_3$ | — | — | — | — | 161 | 161 | 161 | 161 | 161 |
| Boric Acid | 134 | 72.3 | 72.3 | 134 | 134 | 134 | 134 | 134 | 134 |
| K$_2$SiF$_6$ | — | 119 | 119 | — | — | — | — | — | — |
| MgO | 226 | 226 | 226 | 226 | 287 | 164 | 199 | 226 | 226 |
| Whiting | 138 | — | — | — | — | — | — | — | — |
| BaCO$_3$ | 411 | 411 | 411 | 411 | 333 | 489 | 368 | 411 | 411 |
| Silica | 1087 | 1055 | 1055 | 1087 | 1087 | 1087 | 1016 | 956 | 956 |
| Litharge | — | — | — | 75.0 | — | — | — | — | — |
| MgCO$_3$ | 72.9 | 72.9 | 72.9 | 72.9 | 72.9 | 72.9 | 72.9 | 72.9 | 72.9 |
| Clay (Georgia Kaolin) | 1421 | 1421 | 1421 | 1421 | 1421 | 1421 | 1577 | 1577 | 1577 |

TABLE II

OXIDE COMPOSITIONS

| Weight % | Ex. 3 | Ex. 4 | Ex. 5 | Ex. 6 | Ex. 7 | Ex. 8 | Ex. 9 | Ex. 10 | Ex. 11 |
| --- | --- | --- | --- | --- | --- | --- | --- | --- | --- |
| MgO | 8.36 | 8.36 | 8.36 | 8.36 | 10.36 | 6.36 | 7.48 | 8.36 | 8.36 |
| Al$_2$O$_3$ | 18.24 | 18.24 | 18.24 | 18.24 | 18.24 | 18.24 | 20.24 | 20.24 | 20.24 |
| SiO$_2$ | 57.85 | 57.85 | 57.85 | 57.85 | 57.85 | 57.85 | 57.85 | 55.85 | 55.85 |
| B$_2$O$_3$ | 2.50 | 1.35 | 1.35 | 2.50 | 2.50 | 2.50 | 2.50 | 2.50 | 2.50 |
| K$_2$O | — | 1.65 | 1.65 | — | 2.50 | 2.50 | 2.50 | 2.50 | 2.50 |
| F | — | 2.00 | 2.00 | — | — | — | — | — | — |
| CaO | 2.50 | — | — | — | — | — | — | — | — |
| BaO | 10.55 | 10.55 | 10.55 | 10.55 | 8.55 | 12.55 | 9.43 | 10.55 | 10.55 |
| PbO | — | — | — | 2.50 | — | — | — | — | — | wherein the ingredients of said preparation are vitrified to an extent at least sufficient for rendering the preparation substantially water resistant, and wherein said flux is $B_2O_3$, $K_2O$, F, $Li_2$ up to 1 percent, PbO, CaO, SrO, ZnO, or a mixture of the same;

b. firing the resulting coated body at a temperature sufficiently high and for a time sufficiently long for converting said composition into a fluid, continuous, vitreous coating;

c. then lowering the temperature to a value at which crystal growth in said vitreous coating occurs within not substantially more than several hours; and d. then cooling the resultant glazed body at a rate consistent at keeping the body integral.

2. The process of claim 1 wherein: the firing is performed at a temperature not substantially more than about 500°C above the liquidus of said frit; the temperature adjustment thereafter is downward to a temperature below the liquidus of the highest melting crystal produced in the vitreous matrix of said surface coating, but not substantially more than about 300°C below the liquidus of the primary low expansion crystal phase formed by crystallization of said surface coating; and the cooling rate of the resultant glazed body is not substantially in excess of about 40°C per minute.

3. The process of claim 2 wherein said frit consists essentially of:

| Ingredient | Percentage (by weight) |
|---|---|
| BaO | 8–15 |
| MgO | 5–10 |
| $Na_2O$ | 0–15, wherein BaO + MgO + $Na_2O$ is 13%–25% |
| $Al_2O_3$ | 10–15 |
| $SiO_2$ | 45–65, the subtotal sum of BaO, MgO, $Na_2O$, $Al_2O_3$, and $SiO_2$ is 80%–95% |
| Flux | 5–20, wherein the $Li_2O$ content of said flux is less than 0.5%. |

4. In a fired ceramic body having a fired glazed frit coating thereon, said body having been fired prior to the application of the glaze frit coating, said glazed frit coating comprising a low-expansion, non-porous, semi-crystalline glass ceramic glaze coating, said coating having a coefficient of expansion less than $5 \times 10^{-6}/°C$, the improvement wherein said glazed frit consists essentially of:

| Ingredient | Percentage (by weight) |
|---|---|
| BaO | 6–65, but not less than 15% when MgO or $Na_2O$ is not present |
| MgO | 0–12 |
| $Na_2O$ | 0–15, wherein BaO + Mgo + $Na_2O$ is 12%–65% |
| $Al_2O_3$ | 9–35 |
| $SiO_2$ | 18–65, wherein the subtotal sum of BaO, MgO, $Na_2O$, $Al_2O_3$, and $SiO_2$ is 70%–95% |
| Flux | 5–30, | wherein the ingredients of said preparation are vitrified to an extent at least sufficient for rendering the preparation substantially water resistant, and wherein said flux is $B_2O_3$, $K_2O$, F, $Li_2O$ up to 1 percent, PbO, CaO, SrO, ZnO, or a mixture of the same.

* * * * *